United States Patent
Qiao et al.

(10) Patent No.: US 11,136,012 B2
(45) Date of Patent: Oct. 5, 2021

(54) METHOD OF DETERMINING A DRIVER'S OVERRIDE INTENTION IN A REAR AUTOMATIC BRAKING SYSTEM

(71) Applicant: Continental Automotive Systems, Inc., Auburn Hills, MI (US)

(72) Inventors: Ningsheng Qiao, Troy, MI (US); Geoff Bauer, Oxford, MI (US); Dominik Froehlich, Ferndale, MI (US); Jeremy McClain, Ortonville, MI (US); Rodrigo Gomez-Mendoza, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/139,293

(22) Filed: Sep. 24, 2018

(65) Prior Publication Data

US 2019/0092292 A1    Mar. 28, 2019

Related U.S. Application Data

(60) Provisional application No. 62/561,910, filed on Sep. 22, 2017.

(51) Int. Cl.
*B60T 7/22* (2006.01)
*B60T 8/32* (2006.01)
*B60T 8/171* (2006.01)

(52) U.S. Cl.
CPC ............... *B60T 7/22* (2013.01); *B60T 8/171* (2013.01); *B60T 8/3255* (2013.01); *B60T 2201/022* (2013.01); *B60T 2201/024* (2013.01); *B60T 2220/04* (2013.01); *B60T 2230/08* (2013.01)

(58) Field of Classification Search
CPC .......... B60T 7/22; B60T 8/3255; B60T 8/171; B60T 2201/024; B60T 2220/04; B60T 2201/022; B60T 2230/08
See application file for complete search history.

(56) References Cited

U.S. PATENT DOCUMENTS

| | | | |
|---|---|---|---|
| 6,339,382 B1 | 1/2002 | Arbinger et al. | |
| 7,057,528 B1 | 6/2006 | Ewing et al. | |
| 7,974,748 B2 | 7/2011 | Schneider | |
| 2010/0131148 A1 | 5/2010 | Camhi | |
| 2013/0282252 A1* | 10/2013 | Takagi | G08G 1/165 701/70 |
| 2014/0222280 A1* | 8/2014 | Salomonsson | B60Q 9/008 701/28 |
| 2016/0101765 A1* | 4/2016 | Reed | B60T 8/171 701/70 |

* cited by examiner

*Primary Examiner* — Marthe Y Marc-Coleman

(57) ABSTRACT

A rear automatic braking system is automatically overridden and released if the accelerator pedal is depressed with the rate of change which is greater than empirically determined threshold beyond a predetermined percentage of its travel for at least a predetermined length of time and if the vehicle's brake pedal is not depressed.

16 Claims, 2 Drawing Sheets

METHOD OF DETERMINING A DRIVER'S OVERRIDE INTENTION IN A REAR AUTOMATIC BRAKING SYSTEM

CROSS REFERENCE TO RELATED APPLICATION

This application claims the benefit of provisional patent application No. 62/561,910, filed Sep. 22, 2017, which is hereby incorporated by reference.

TECHNICAL FIELD

The technical field relates generally to automatic braking systems for vehicles.

BACKGROUND

Rear automatic braking is an active safety technology that helps a driver avoid a crash or to mitigate the impact into objects directly behind a vehicle. Such systems may provide an alert the driver of potential hazards and automatically apply braking to avoid or mitigate back over collisions when the vehicle is in the reverse gear and traveling at speeds anywhere between about 0.5-20 miles per hour (0.8-32 km/h).

When a potential object-impact threat is detected, and the brakes are applied, further movement in the rear direction is inhibited. Under certain circumstances, however, the driver might desire to override an automatic rear braking system. For example, the driver believes there are some issues on object detection, or to avoid another potential collision when driver is facing multiple of potential collisions.

As such, it is desirable to present a method and apparatus for overriding a rear automatic braking system. In addition, other desirable features and characteristics will become apparent from the subsequent summary and detailed description, and the appended claims, taken in conjunction with the accompanying drawings and this background.

BRIEF SUMMARY

In one exemplary embodiment, a method of overriding a rear automatic braking system for a vehicle is presented. The vehicle includes brakes, a braking system, a brake pedal, an accelerator pedal, and a transmission. The method includes capturing an image of a region behind the vehicle. The method also includes analyzing the image to identify an object that may be struck by the vehicle when the vehicle moves backward. The method further includes activating the rear automatic braking system to engage the brakes of the vehicle in response to the object being identified. The method further includes sensing a position of the brake pedal and sensing a position of the accelerator pedal. The method also includes overriding the rear automatic braking system by automatically releasing the brakes when the vehicle is moving backwards in response to the brake pedal not being depressed and the accelerator pedal being depressed beyond a predetermined position.

In one exemplary embodiment, an apparatus that overrides a rear automatic braking system for a vehicle is presented. The vehicle includes brakes, a braking system, a brake pedal, an accelerator pedal, and a transmission. The apparatus includes a rearward facing camera coupled to the vehicle and configured to capture an image of a region behind the vehicle. The apparatus also includes a processor in communication with the camera. A non-volatile memory device is in communication with the processor and stores instructions. When these instructions are executed, they cause the processor to analyze the captured image to identify an object that may be struck by the vehicle when the vehicle moves backward and activate the rear automatic braking system to engage the brakes of the vehicle in response to the object being identified. The apparatus also includes a brake pedal position sensor in communication with the processor to sense a position of the brake pedal and a throttle position sensor in communication with the processor to sense the position of the accelerator pedal. Additional program instructions in the non-volatile memory device cause the processor to override the rear automatic braking system to release the applied brakes when the vehicle moves backward in response to the accelerator pedal being depressed and the brake pedal not being depressed.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
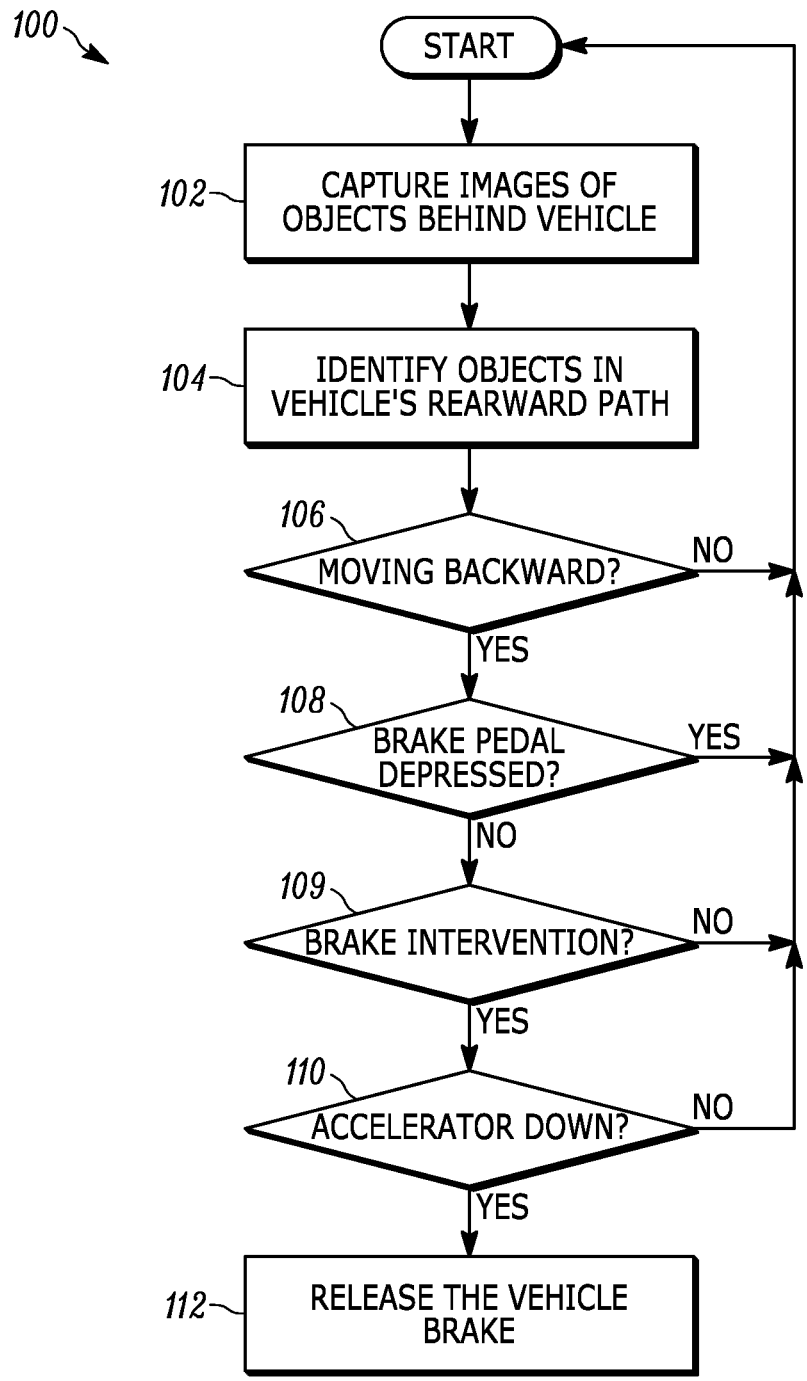
FIG. 1 is a flowcharting showing a method to override a rear automatic braking system of a vehicle according to one exemplary embodiment.

FIG. 1 depicts steps of a method 100 by which a rear automatic braking system for a vehicle (not shown) can be overridden. The vehicle includes brakes (not shown), a braking system (not shown), a brake pedal (not shown) that controls the braking system 224, an accelerator pedal (not shown), and a transmission (not shown). The method 100 overrides the rear automatic braking system by essentially inferring a driver's intent from various actions of the driver in combination with various vehicle operating conditions, as described in examples below.

The method 100 includes, at 102, a rearward-facing camera 202, typically embodied as a commonly-installed backup camera, capturing at least one image of a region (not shown) behind the vehicle. Those images may be captured as single frames of video by the camera 202 and provided by the camera 202 to a conventional processor 204, shown in FIG. 2, but which is programmed to identify objects in the captured video frame.

Techniques to identify an object by its shape are well known. Further description of them is therefore omitted in the interest of brevity.

The method 100 also includes, at 104, program instructions that cause the processor to analyze the image to identify objects in the captured frame that are also in the rearward path of the vehicle. A human is an example of a class or type of object that can be identified by an appropriately programmed computer. Other objects detected would of course include any solid body in the way of the vehicle if it were to move backward.

Determining whether an object behind the vehicle is, or will be, in the path of the vehicle may require determining the steering wheel position, the speed of the vehicle, the acceleration of the vehicle, the distance between an object and the back of the vehicle, and any determined movement of the object.

In one exemplary embodiment, determining whether an object is behind the vehicle and in the rearward path of the vehicle uses a steering wheel angle determination, which may be made with a gauge (not shown) that measures a steering wheel angle as well as the rate of steering wheel angle change, i.e., the steering wheel angle gradient.

Determining the speed of the vehicle is a matter of simply reading such information from a wheel rotation sensor 216, as is appreciated by those of ordinary skill in the art. An accelerometer 214 attached to the vehicle can provide the rate of acceleration of the vehicle in essentially any direction and, determining the distance between the vehicle and an object behind it using well-known ultrasonic range finding technology 220.

At 106 in the method 100, a determination is made as to whether the vehicle is moving backward. The vehicle's direction of travel can be determined a number of ways, including, but not limited, to the direction of wheel rotation by wheel rotation sensors, the transmission's gear selector 212, and/or an accelerometer 214.

If the vehicle is not moving backward, there is no need to override a rear automatic braking system in which case the method 100 returns to continue to capture objects behind the vehicle. On the other hand, if the vehicle is moving backward as determined at 106, another test must be performed at 108 to determine whether the brake pedal is depressed.

If a brake pedal in a vehicle equipped with a rear automatic braking system is depressed, it can be fairly assumed that the driver does not want to override the rear automatic braking system but rather intends to stop the vehicle from moving backward. At 108 of the method 100, a decision is made where if the brake pedal is not depressed, the driver may very well wish the vehicle to continue backward, toward the object detected by the rear automatic braking system. At 108 therefore, the method 100 proceeds to 110 where a test or determination is made whether the accelerator of the vehicle is depressed.

The actuation of the accelerator and its determination as such at 110 is important to the method 100. The determination to override a rear automatic braking system is made at least in part by evaluation of the accelerator pedal position.

In one embodiment, the override of the rear automatic braking system is enabled if the brake pedal actuation is negative and the position of the accelerator pedal is past a predetermined percentage of its travel that is empirically determined as indicating that the driver wants the vehicle to move. In one embodiment, if the driver steps on the accelerator pedal hard enough, i.e., the rate of change is greater than empirically determined threshold, to make the accelerator pedal percentage greater than the empirically determined pedal threshold, and keep acceleration pedal press for an empirically determined time period, the override of the rear automatic braking system is activated.

The threshold or pedal travel percentage is a function of the speed of the vehicle, weight, power train, and/or other factors. It can also be embodied in a lookup table. When an accelerator pedal is pushed past the threshold position, regardless of how it is determined, the automatic rear brake system is overridden, the vehicle brakes are released.

Those of ordinary skill in the art should know that when a rear automatic braking system actuates and causes the vehicle to brake hard or stop suddenly, the resultant deceleration can propel some drivers backward with such force that it can sometimes cause a sharp sudden and unintentional accelerator pedal actuation. As used herein, the term whiplash refers to the sharp sudden and unintentional actuation of an accelerator pedal caused by a sharp or hard braking of a rear automatic braking system. In one embodiment, a driver whiplash detection inhibits the override of the rear automatic braking system for a short period of time after a rearward deceleration by the vehicle is detected. In such an embodiment, at 110 as shown in FIG. 1, the sensing of the position of the accelerator pedal includes the detection of a rearward deceleration by the vehicle. If that rearward deceleration is greater than an empirically determined threshold, the method waits a predetermined time after the rear deceleration has begun and in other embodiments after the rear deceleration has stopped before allowing the rear automatic braking system to by overridden. Stated another way, the method 100 and apparatus 200 disclosed herein temporarily limits the ability to override a rear automatic braking system after such a system has been engaged to at least mitigate the possibility that a subsequent hard acceleration by the driver is inadvertent.

Figure 2:
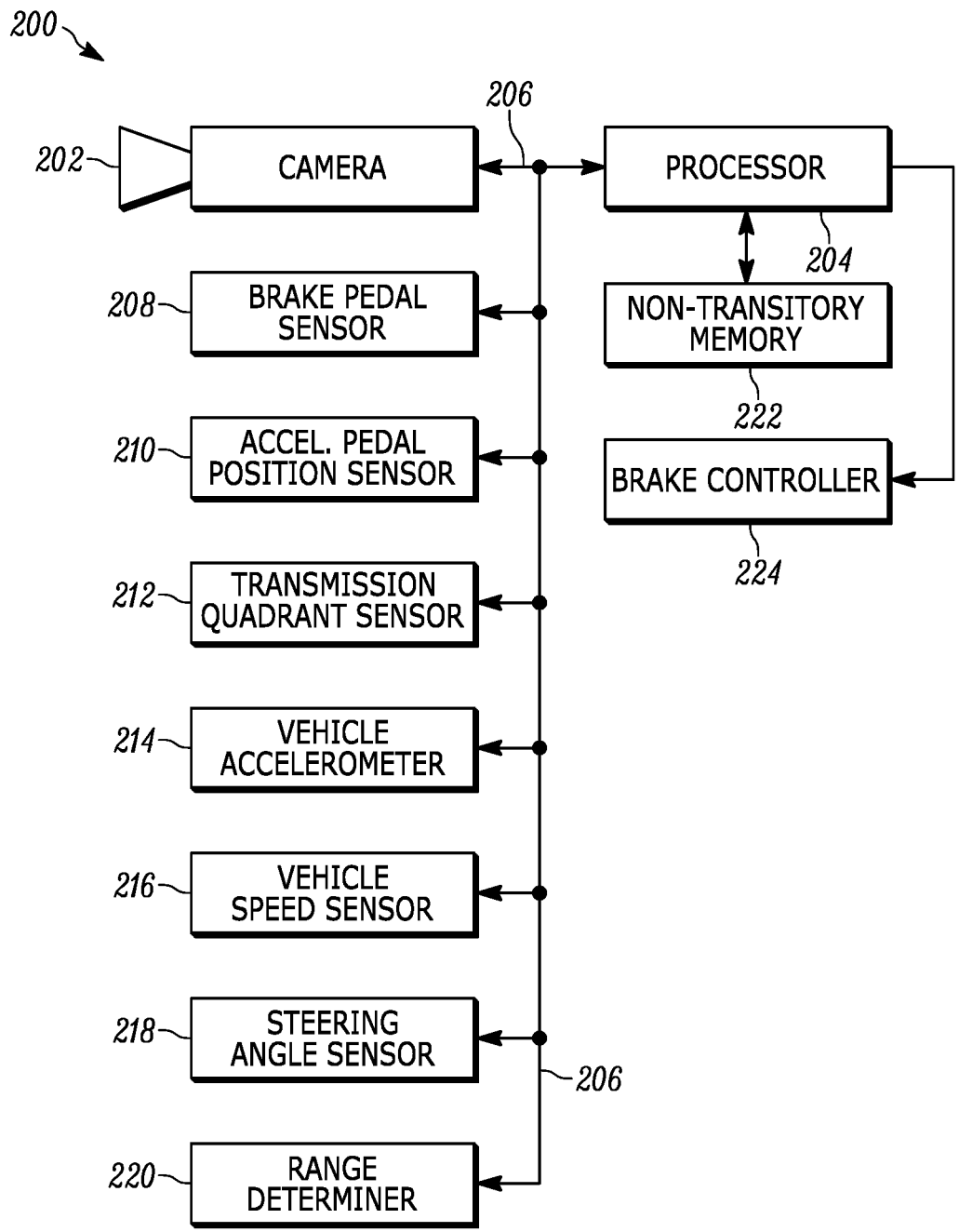
FIG. 2 is a block diagram of an apparatus for overriding a rear automatic braking system of a vehicle according to one exemplary embodiment.

FIG. 2 depicts an apparatus 200 that can override a rear automatic braking system for a vehicle with brakes, a braking system 224, a brake pedal, an accelerator pedal, and a transmission. The apparatus 200 comprises a rear-facing camera 202 which is operatively coupled to a processor 204 via a conventional bus 206. A bus 206 may be implemented a set of electrically-parallel conductors in a computer system that form a main information transmission path. Commonly known embodiments of a bus 206 used in a vehicle is the CAN bus, the details of which are well-known in the art. Of course, other embodiments for the bus 206, such as a radio network and/or optical fibers may also or alternatively be utilized.

Also coupled to the bus 206 is a brake pedal position sensor 208, a throttle position sensor 210, a transmission quadrant sensor 212, which detects whether the transmission is in park, reverse, neutral or drive. A vehicle accelerometer 214, vehicle speed sensor 216, steering angle sensor 218 and a rear-facing range determiner 220 are also coupled to the bus 206 and thus coupled directly to the processor 204.

A conventional address/data/control bus (not numbered) couples the processor 204 to a non-transitory memory device 222.

The non-transitory memory device 222 stores program instructions which when executed by the processor 204 cause it to obtain images from the camera 202, determine what those images represent, and obtain information from the various sensors 208-220 and make a decision as to the likely intent of the driver.

In one embodiment, the program instructions cause the processor 204 to identify objects in images captured by the camera 202 and determine whether they will be struck by the vehicle if it moves backwardly based upon the transmission quadrant sensor 212, accelerator 214, the steering angle sensor 218, and/or the range determiner 220, which ultrasonically determines the distance between detected objects and the vehicle.

If it is determined that an object behind the vehicle is likely to be struck if the vehicle moves backward, a determination is necessarily made whether the driver wants to override the rear automatic braking system.

A control signal sent to the brake controller 224 over the bus 206 instructs the brake controller 224 to release hydraulic pressure applied to the vehicle brakes (or electric power to electric brakes, in such an instance). The apparatus 200 is thus configured to override a rear automatic braking system for a vehicle based upon actuation of the accelerator pedal by determining the throttle position sensor output, operation of the vehicle brake pedal, the vehicle's speed and whether or not it is moving.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of overriding a rear automatic braking system for a vehicle having brakes and a braking system, a brake pedal, an accelerator pedal, and a transmission, the method comprising:
   capturing an image of a region behind the vehicle with a camera;
   analyzing the image with a processor to identify an object that may be struck by the vehicle when the vehicle moves backward;
   activating the rear automatic braking system with the processor to engage the brakes of the vehicle in response to the object being identified;
   sensing a position of the brake pedal;
   sensing a position of the accelerator pedal;
   overriding the rear automatic braking system with the processor by automatically releasing the brakes when the vehicle is moving backwards in response to the brake pedal not being depressed and the accelerator pedal being depressed beyond a predetermined position.

2. The method as set forth in claim 1, wherein sensing the position of the accelerator pedal is performed over time and wherein overriding the rear automatic braking system further comprises automatically releasing the brakes when the brakes when the vehicle is moving backwards in response to the brake pedal not being depressed and the accelerator pedal is depressed with the rate of change which is greater than empirically determined threshold beyond a predetermined position.

3. The method as set forth in claim 1, wherein overriding the rear automatic braking system further comprises automatically releasing the brakes when the vehicle is moving backwards in response to the brake pedal not being depressed and the accelerator pedal being depressed beyond a predetermined position for a predetermined amount of time.

4. The method as set forth in claim 1, wherein the object is a human.

5. The method as set forth in claim 1, wherein analyzing the image to identify an object that may be struck by the vehicle when the vehicle moves backward comprises at least one of:
   determining a steering wheel angle;
   determining a steering wheel angle gradient;
   determining the vehicle's speed;
   determining the vehicle's acceleration; and
   determining a distance between an object behind the and the vehicle.

6. The method as set forth in claim 1, further comprising:
   detecting a rearward deceleration by the vehicle;
   if the rearward deceleration is greater than a predetermined threshold, then, waiting a predetermined time after the rearward deceleration has begun before determining if the accelerator pedal is depressed and waiting for the predetermined amount of time to elapse before overriding the rear automatic braking system.

7. The method as set forth in claim 1, further comprising:
   detecting a rearward deceleration by the vehicle;
   if the rearward deceleration is greater than a predetermined threshold, then, waiting a predetermined time after the rearward deceleration has stopped before determining if the accelerator pedal is depressed and waiting for the predetermined amount of time to elapse before overriding the rear automatic braking system.

8. The method as set forth in claim 1, wherein accelerator pedal being depressed beyond a predetermined position further comprises a predetermined amount of pedal travel.

9. The method as set forth in claim 1, wherein accelerator pedal being depressed beyond a predetermined position further comprises a predetermined amount of force on the pedal.

10. The method as set forth in claim 1, wherein accelerator pedal being depressed beyond a predetermined position further comprises a predetermined amount of time force is applied to the pedal.

11. The method as set forth in claim 1, wherein overriding the rear automatic braking system by automatically releasing the brakes when the vehicle is moving backwards in response to the brake pedal not being depressed and the accelerator pedal being depressed beyond the predetermined position occurs prior to the rear automatic braking system bring the vehicle to a full stop.

12. An apparatus that overrides a rear automatic braking system for a vehicle having brakes and a braking system, a brake pedal, an accelerator pedal, and a transmission, the apparatus comprising:
   a rearward facing camera coupled to the vehicle and configured to capture an image of a region behind the vehicle;
   a processor in communication with the camera;
   a non-volatile memory device in communication with the processor and storing instructions which when executed cause the processor to:
      analyze the capture image to identify an object that may be struck by the vehicle when the vehicle moves backward; and
      activate the rear automatic braking system to engage the brakes of the vehicle in response to the object being identified;
   a brake pedal position sensor in communication with the processor to sense a position of the brake pedal; and
   a throttle position sensor in communication with the processor to sense the position of the accelerator pedal;
   wherein, additional program instructions in the non-volatile memory device cause the processor to override the rear automatic braking system to release the applied brakes when the vehicle moves backward in response to the accelerator pedal being depressed and the brake pedal not being depressed.

13. The apparatus as set forth in claim 12, wherein accelerator pedal being depressed beyond a predetermined position further comprises a predetermined amount of pedal travel.

14. The apparatus as set forth in claim 12, wherein accelerator pedal being depressed beyond a predetermined position further comprises a predetermined amount of force on the pedal.

15. The apparatus as set forth in claim 12, wherein accelerator pedal being depressed beyond a predetermined position further comprises a predetermined amount of time force is applied to the pedal.

16. The apparatus as set forth in claim 12, wherein overriding the rear automatic braking system by automatically releasing the brakes when the vehicle is moving backwards in response to the brake pedal not being depressed and the accelerator pedal being depressed beyond the predetermined position occurs prior to the rear automatic braking system bring the vehicle to a full stop.

\* \* \* \* \*